US011948082B2

(12) United States Patent
Yan et al.

(10) Patent No.: US 11,948,082 B2
(45) Date of Patent: *Apr. 2, 2024

(54) SYSTEM AND METHOD FOR PROXIMATE VEHICLE INTENTION PREDICTION FOR AUTONOMOUS VEHICLES

(71) Applicant: TUSIMPLE, INC., San Diego, CA (US)

(72) Inventors: Zhipeng Yan, San Diego, CA (US); Mingdong Wang, San Diego, CA (US); Siyuan Liu, San Diego, CA (US); Xiaodi Hou, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/401,781

(22) Filed: Aug. 13, 2021

(65) Prior Publication Data

US 2021/0370932 A1   Dec. 2, 2021

Related U.S. Application Data

(63) Continuation of application No. 15/994,138, filed on May 31, 2018, now Pat. No. 11,104,334.

(51) Int. Cl.
*G06N 3/08* (2023.01)
*B60W 30/09* (2012.01)
(Continued)

(52) U.S. Cl.
CPC ............... *G06N 3/08* (2013.01); *B60W 30/09* (2013.01); *B60W 30/0956* (2013.01);
(Continued)

(58) Field of Classification Search
CPC ........... G06N 3/08; G06N 7/01; G06N 5/046; G06V 20/58; G06V 20/584; G06V 10/764;
(Continued)

(56) References Cited

U.S. PATENT DOCUMENTS 6,777,904 B1   8/2004  Degner et al.
7,103,460 B1   9/2006  Breed
(Continued)

FOREIGN PATENT DOCUMENTS

CN   106663284 A   5/2017
EP      1754179 A1   2/2007
(Continued)

OTHER PUBLICATIONS

European Patent Office, Extended European search report for EP 198107595.5, dated Feb. 3, 2022, 11 pages with English translation.
(Continued)

*Primary Examiner* — Michael D Lang
(74) *Attorney, Agent, or Firm* — Perkins Coie LLP

(57) ABSTRACT

A system and method for proximate vehicle intention prediction for autonomous vehicles are disclosed. A particular embodiment is configured to: receive perception data associated with a host vehicle; extract features from the perception data to detect a proximate vehicle in the vicinity of the host vehicle; generate a trajectory of the detected proximate vehicle based on the perception data; use a trained intention prediction model to generate a predicted intention of the detected proximate vehicle based on the perception data and the trajectory of the detected proximate vehicle; use the predicted intention of the detected proximate vehicle to generate a predicted trajectory of the detected proximate vehicle; and output the predicted intention and predicted trajectory for the detected proximate vehicle to another subsystem.

20 Claims, 9 Drawing Sheets

(51) Int. Cl.
  *B60W 30/095* (2012.01)
  *G05D 1/00* (2006.01)
  *G05D 1/02* (2020.01)
  *G06F 18/20* (2023.01)
  *G06N 5/046* (2023.01)
  *G06N 7/01* (2023.01)
  *G06V 10/764* (2022.01)
  *G06V 20/58* (2022.01)

(52) U.S. Cl.
  CPC .......... *G05D 1/027* (2013.01); *G06F 18/295* (2023.01); *G06N 5/046* (2013.01); *G06N 7/01* (2023.01); *G06V 10/764* (2022.01); *G06V 20/58* (2022.01); *G06V 20/584* (2022.01); *B60W 2420/42* (2013.01); *B60W 2420/52* (2013.01); *B60W 2556/50* (2020.02); *B60W 2556/60* (2020.02)

(58) Field of Classification Search
  CPC . G06F 18/295; B60W 30/09; B60W 30/0956; G05D 1/027
  See application file for complete search history.

(56) References Cited

U.S. PATENT DOCUMENTS

| | | |
|---|---|---|
| 7,689,559 B2 | 3/2010 | Canright et al. |
| 7,783,403 B2 | 8/2010 | Breed |
| 7,844,595 B2 | 11/2010 | Canright et al. |
| 8,041,111 B1 | 10/2011 | Wilensky |
| 8,064,643 B2 | 11/2011 | Stein et al. |
| 8,082,101 B2 | 12/2011 | Stein et al. |
| 8,164,628 B2 | 4/2012 | Stein et al. |
| 8,175,376 B2 | 5/2012 | Marchesotti et al. |
| 8,271,871 B2 | 9/2012 | Marchesotti |
| 8,378,851 B2 | 2/2013 | Stein et al. |
| 8,392,117 B2 | 3/2013 | Dolgov et al. |
| 8,401,292 B2 | 3/2013 | Park et al. |
| 8,412,449 B2 | 4/2013 | Trepagnier et al. |
| 8,478,072 B2 | 7/2013 | Aisaka et al. |
| 8,553,088 B2 | 10/2013 | Stein et al. |
| 8,788,134 B1 | 7/2014 | Litkouhi et al. |
| 8,908,041 B2 | 12/2014 | Stein et al. |
| 8,917,169 B2 | 12/2014 | Schofield et al. |
| 8,963,913 B2 | 2/2015 | Baek |
| 8,965,621 B1 | 2/2015 | Urmson et al. |
| 8,981,966 B2 | 3/2015 | Stein et al. |
| 8,993,951 B2 | 3/2015 | Schofield et al. |
| 9,002,632 B1 | 4/2015 | Emigh |
| 9,008,369 B2 | 4/2015 | Schofield et al. |
| 9,025,880 B2 | 5/2015 | Perazzi et al. |
| 9,042,648 B2 | 5/2015 | Wang et al. |
| 9,111,444 B2 | 8/2015 | Kaganovich |
| 9,117,133 B2 | 8/2015 | Barnes et al. |
| 9,118,816 B2 | 8/2015 | Stein et al. |
| 9,120,485 B1 | 9/2015 | Dolgov |
| 9,122,954 B2 | 9/2015 | Srebnik et al. |
| 9,123,091 B2 | 9/2015 | Robinson et al. |
| 9,123,099 B2 | 9/2015 | Hundley et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,834 B1 | 2/2016 | Ferguson et al. |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,286,522 B2 | 3/2016 | Stein et al. |
| 9,297,641 B2 | 3/2016 | Stein |
| 9,299,004 B2 | 3/2016 | Lin et al. |
| 9,315,192 B1 | 4/2016 | Zhu et al. |
| 9,317,033 B2 | 4/2016 | Ibanez-guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,355,635 B2 | 5/2016 | Gao et al. |
| 9,365,214 B2 | 6/2016 | Shalom et al. |
| 9,399,397 B2 | 7/2016 | Mizutani et al. |
| 9,428,192 B2 | 8/2016 | Schofield et al. |
| 9,436,880 B2 | 9/2016 | Bos et al. |
| 9,438,878 B2 | 9/2016 | Niebla, Jr. et al. |
| 9,443,163 B2 | 9/2016 | Springer |
| 9,446,765 B2 | 9/2016 | Shalom et al. |
| 9,459,515 B2 | 10/2016 | Stein |
| 9,466,006 B2 | 10/2016 | Duan |
| 9,476,970 B1 | 10/2016 | Fairfield et al. |
| 9,490,064 B2 | 11/2016 | Hirosawa et al. |
| 9,531,966 B2 | 12/2016 | Stein et al. |
| 9,535,423 B1 | 1/2017 | Debreczeni |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,720,418 B2 | 8/2017 | Stenneth |
| 9,723,097 B2 | 8/2017 | Harris et al. |
| 9,723,099 B2 | 8/2017 | Chen et al. |
| 9,738,280 B2 | 8/2017 | Rayes |
| 9,746,550 B2 | 8/2017 | Nath et al. |
| 10,074,279 B1 | 9/2018 | Xu et al. |
| 10,671,076 B1 | 6/2020 | Kobilarov et al. |
| 2007/0193798 A1 | 8/2007 | Allard et al. |
| 2007/0230792 A1 | 10/2007 | Shashua et al. |
| 2008/0249667 A1 | 10/2008 | Horvitz et al. |
| 2009/0040054 A1 | 2/2009 | Wang et al. |
| 2010/0049397 A1 | 2/2010 | Liu et al. |
| 2010/0097458 A1 | 4/2010 | Zhang et al. |
| 2010/0104199 A1 | 4/2010 | Zhang et al. |
| 2010/0226564 A1 | 9/2010 | Marchesotti et al. |
| 2010/0281361 A1 | 11/2010 | Marchesotti |
| 2011/0206282 A1 | 8/2011 | Aisaka et al. |
| 2012/0105639 A1 | 5/2012 | Stein et al. |
| 2012/0140076 A1 | 6/2012 | Rosenbaum et al. |
| 2012/0274629 A1 | 11/2012 | Baek |
| 2014/0145516 A1 | 5/2014 | Hirosawa et al. |
| 2014/0198184 A1 | 7/2014 | Stein et al. |
| 2015/0062304 A1 | 3/2015 | Stein et al. |
| 2015/0353082 A1 | 12/2015 | Lee et al. |
| 2016/0037064 A1 | 2/2016 | Stein et al. |
| 2016/0094774 A1 | 3/2016 | Li et al. |
| 2016/0129907 A1 | 5/2016 | Kim et al. |
| 2016/0165157 A1 | 6/2016 | Stein et al. |
| 2016/0210528 A1 | 7/2016 | Duan |
| 2016/0321381 A1 | 11/2016 | English et al. |
| 2016/0364472 A1 | 12/2016 | Bak et al. |
| 2016/0375907 A1 | 12/2016 | Erban |
| 2017/0043771 A1 | 2/2017 | Ibanez-guzman et al. |
| 2018/0089505 A1 | 3/2018 | El-khamy et al. |
| 2018/0141544 A1 | 5/2018 | Xiao et al. |
| 2018/0173240 A1 | 6/2018 | Fang et al. |
| 2019/0049970 A1 | 2/2019 | Djuric et al. |
| 2019/0096256 A1 | 3/2019 | Rowell |
| 2019/0147250 A1 | 5/2019 | Zhang et al. |
| 2019/0286165 A1 | 9/2019 | Wood et al. |

FOREIGN PATENT DOCUMENTS

| | | |
|---|---|---|
| EP | 2448251 A2 | 5/2012 |
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |

(56) References Cited

FOREIGN PATENT DOCUMENTS

| | | |
|---|---|---|
| EP | 2957462 B1 | 6/2022 |
| WO | 2005098739 A1 | 10/2005 |
| WO | 2005098751 A1 | 10/2005 |
| WO | 2005098782 A1 | 10/2005 |
| WO | 2010109419 A1 | 9/2010 |
| WO | 2013045612 A1 | 4/2013 |
| WO | 2014111814 A2 | 7/2014 |
| WO | 2014201324 A1 | 12/2014 |
| WO | 2014111814 A3 | 2/2015 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2015186002 A3 | 3/2016 |
| WO | 2016135736 A2 | 9/2016 |
| WO | 2017013875 A1 | 1/2017 |

OTHER PUBLICATIONS

Schreier, Matthias, et al., "An Integrated Approach to Maneuver-Based Trajectory Prediction and Criticality Assessment in Arbitrary Road Environments", IEEE Transactions on Intelligent Transportation Systems, Oct. 1, 2016, pp. 2751-2766, vol. 17, No. 10, Piscataway, NJ, USA.

Liu, Peng, et al: "Trajectory prediction of 1-15 a lane changing vehicle based on driver behavior estimation and classification", 17th International IEEE Conference on Intelligent Transportation Systems (ITSC), 2014 IEEE, Oct. 8-11, 2014, pp. 942-947, Qingdao, China.

Liebner, Martin, et al: "Driver intent inference at urban intersections using the intelligent driver model", Intelligent Vehicles Symposium (IV), 2012 IEEE, Jun. 3-7, 2012, pp. 1162-1167, Alcala de Henares, Spain.

Lenz, David, et al: "Deep neural networks 1-15 for Markovian interactive scene prediction in highway scenarios", Intelligent Vehicles Symposium (IV), 2017 IEEE, Jun. 11-14, 2017, pp. 685-692, Redondo Beach, CA, USA.

Chinese Patent Office, First Office Action for CN 201980036132.0, dated Jul. 1, 2022, 26 pages with translation.

Chinese Patent Office, First Office Action Search Report for CN 201980036132.0, dated Jun. 26, 2022, 3 pages.

International Search Report and Written Opinion for International Application No. PCT/US19/34882, dated Aug. 20, 2019.

Ahn, Kyoungho, et al., "The Effects of Route Choice Decisions on Vehicle Energy Consumption and Emissions", Virginia Tech Transportation Institute, date unknown.

Athanasiadis, Thanos, et al., "Semantic Image Segmentation and Object Labeling", IEEE Transactions on Circuits and Systems for Video Technology, 17(3).

Barth, Matthew, et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Cordts, Marius, et al., "The Cityscapes Dataset for Semantic Urban Scene Understanding", Proceedings of the IEEE Computer Society Conference on Computer Vision and Pattern Recognition (CVPR), Las Vegas.

Dai, Jifeng, et al., "Instance-aware Semantic Segmentation via Multi-task Network Cascades", Microsoft Research, CVPR, 10 pp.

Guarneri, P., et al., "A Neural-Network-Based Model for the Dynamic Simulation of the Tire/Suspension System While Traversing Road Irregularities", IEEE Transactions on Neural Networks, 19(9), 1549-1563.

Hou, Xiaodi, et al., "Image Signature: Highlighting Sparse Salient Regions", IEEE Transactions on Pattern Analysis and Machine Intelligence, 34(1), 194-201.

Hou, Xiaodi, et al., "A Mela-Theory of Boundary Detection Benchmarks", arXiv preprint arXiv:1302.5985, 2013.

Hou, Xiaodi, et al., "A Time-Dependent Model of Information Capacity of Visual Attention", International Conference on Neural Information Processing, Springer Berlin Heidelberg, 127-136.

Hou, Xiaodi, et al., "Boundary Detection Benchmarking: Beyond F-Measures", Computer Vision and Pattern Recognition, CVPR'13, IEEE, 1-8.

Hou, Xiaodi, et al., "Color Conceptualization", Proceedings of the 15th ACM International Conference on Multimedia, ACM, 265-268.

Hou, Xiaodi, "Computational Modeling and Psychophysics in Low and Mid-Level Vision", California Institute of Technology.

Hou, Xiaodi, et al., "Dynamic Visual Attention: Searching For Coding Length Increments", Advances in Neural Information Processing Systems, 21, 681-688.

Hou, Xiaodi, et al., "Saliency Detection: A Spectral Residual Approach", Computer Vision and Pattern Recognition, CVPR'07—IEEE Conference, 1-8.

Hou, Xiaodi, et al., "Thumbnail Generation Based on Global Saliency", Advances in Cognitive Neurodynamics, ICCN 2007, Springer Netherlands, 999-1003.

Huval, Brody, et al., "An Empirical Evaluation of Deep Learning on Highway Driving", arXiv:1504.01716v3 [cs.RO], 7 pp.

Jain, Suyong Dutt, et al., "Active Image Segmentation Propagation", In Proceedings of the IEEE Conference on Computer Vision and Pattern Recognition (CVPR), Las Vegas.

Kendall, Alex, et al., "What Uncertainties Do We Need in Bayesian Deep Learning for Computer Vision", arXiv:1703.04977v1 [cs.CV].

Li, Tian, "Proposal Free Instance Segmentation Based on Instance-aware Metric", Department of Computer Science, Cranberry-Lemon University, Pittsburgh, PA, date unknown.

Li, Yanghao, et al., "Demystifying Neural Style Transfer", arXiv preprint arXiv:1701.01036.

Li, Yanghao, et al., "Factorized Bilinear Models for Image Recognition", arXiv preprint arXiv:1611.05709.

Li, Yanghao, et al., "Revisiting Batch Normalization for Practical Domain Adaptation", arXiv preprint arXiv:1603.04779.

Li, Yin, et al., "The Secrets of Salient Object Segmentation", Proceedings of the IEEE Conference on Computer Vision and Pattern Recognition, 280-287.

Macaodha, Oisin, et al., "Hierarchical Subquery Evaluation for Active Learning on a Graph", In Proceedings of the IEEE Conference on Computer Vision and Pattern Recognition (CVPR).

Norouzi, Mohammad, et al., "Hamming Distance Metric Learning", Departments of Computer Science and Statistics, University of Toronto, date unknown.

Paszke, Adam, et al., "Enet: A deep neural network architecture for real-time semantic segmentation", CoRR, abs/1606.02147.

Ramos, Sebastian, et al., "Detecting Unexpected Obstacles for Self-Driving Cars: Fusing Deep Learning and Geometric Modeling", arXiv:1612.06573v1 [cs.CV], 8 pp.

Richter, Stephen, et al., "Playing for Data: Ground Truth from Computer Games", Intel Labs, European Conference on Computer Vision (ECCV), Amsterdam, the Netherlands.

Schroff, Florian, et al., "FaceNet: A Unified Embedding for Face Recognition and Clustering", Google, CVPR, 10 pp.

Somani, Adhiraj, et al., "DESPOT: Online POMDP Planning with Regularization", Department of Computer Science, National University of Singapore, date unknown.

Spinello, Luciano, et al., "Multiclass Multimodal Detection and Tracking in Urban Environments", Sage Journals, 29(12)Article first published online: Oct. 7, 2010; Issue published: Oct. 1, 2010, 1498-1515.

Wang, Panqu, et al., "Understanding Convolution for Semantic Segmentation", arXiv preprint arXiv:1702.08502.

Wei, Junqing, et al., "A Prediction- and Cost Function-Based Algorithm for Robust Autonomous Freeway Driving", 2010 IEEE Intelligent Vehicles Symposium, University of California, San Diego, CA, USA.

Welinder, Peter, et al., "The Multidimensional Wisdom of Crowds", http://www.vision.caltech.edu/visipedia/papers/WelinderEtalNIPS10.pdf.

(56) References Cited

OTHER PUBLICATIONS

Yang, C., "Neural Network-Based Motion Control of an Underactuated Wheeled Inverted Pendulum Model", IEEE Transactions on Neural Networks and Learning Systems, 25(11), 2004-2016.

Yu, Kai, et al., "Large-scale Distributed Video Parsing and Evaluation Platform", Center for Research on Intelligent Perception and Computing, Institute of Automation, Chinese Academy of Sciences, China, arXiv:1611.09580v1 [cs.CV].

Zhou, Bolei, et al., "A Phase Discrepancy Analysis of Object Motion", Asian Conference on Computer Vision, Springer Berlin Heidelberg, 225-238.

Non-Final Office Action for U.S. Appl. No. 15/994,103, dated May 18, 2021 (16 pages).

Australian Patent Office, Examination Report #1 for AU Patent Application No. 2019278974, dated Jan. 23, 2024, 4 pages.

SYSTEM AND METHOD FOR PROXIMATE VEHICLE INTENTION PREDICTION FOR AUTONOMOUS VEHICLES

CROSS REFERENCE TO RELATED APPLICATIONS

This patent document is a continuation of and claims benefit of priority to U.S. application Ser. No. 15/994,138, filed May 31, 2018. The entire content of the before-mentioned patent application is incorporated by reference as part of the disclosure of this document.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2017-2021, TuSimple, All Rights Reserved.

TECHNICAL FIELD

This patent document pertains generally to tools (systems, apparatuses, methodologies, computer program products, etc.) for motion planning, trajectory planning, vehicle control systems, and autonomous driving systems, and more particularly, but not by way of limitation, to a system and method for proximate vehicle intention prediction for autonomous vehicles.

BACKGROUND

An autonomous vehicle is often configured to follow a trajectory based on a computed driving path. However, when variables such as obstacles are present on the driving path, the autonomous vehicle must perform control operations so that the vehicle may be safely driven by changing the driving path to avoid the obstacles.

In the related art, autonomous vehicle control operations have been determined by representing spatial information (e.g., a coordinate, a heading angle, a curvature, etc.) of the driving path as a polynomial expression or mathematical function for a movement distance in order to avoid a stationary obstacle. However, when dynamic obstacles are present on the driving path, the autonomous vehicle according to the related art may not accurately predict whether or not the vehicle will collide with the dynamic obstacles. In particular, the related art does not consider the interaction between the autonomous vehicle and other dynamic vehicles. Therefore, conventional autonomous vehicle control systems cannot accurately predict the future actions or positions of other proximate dynamic vehicles. As a result, the optimal behavior of the conventional autonomous vehicle cannot be achieved. For example, the unexpected behavior of a proximate dynamic obstacle may result in a collision with the conventional autonomous vehicle.

SUMMARY

A system and method for proximate vehicle intention prediction for autonomous vehicles is disclosed herein. Specifically, the present disclosure relates to the design, configuration, and/or control of autonomous vehicles using a prediction-based method. In one aspect, the system herein may include various sensors configured to collect perception data, a computing device, and an intention prediction module for predicting an intention and behavior of other vehicles and/or dynamic objects in the vicinity of (proximate to) a host autonomous vehicle. The example embodiments disclosed herein provide a system and method for intention prediction in an autonomous driving architecture. Intention prediction provides autonomous vehicles with the ability to predict the near future behavior of surrounding proximate vehicles and, for example, to improve the motion planning and plan execution of the host vehicle. The system of an example embodiment receives perception data image features, and map information to generate a series of predictions related to a proximate target vehicle's speed, pose, and intention. In a particular embodiment, the system can provide these predictions to a motion planning module of the host vehicle. In other embodiments, the proximate vehicle intention predictions can be used to design, configure, and/or control an autonomous vehicle or related simulation environments. The system of an example embodiment can also be configured for perception feature selection. The system and method of example embodiments are described in more detail below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for proximate vehicle intention prediction for autonomous vehicles are described herein. An example embodiment disclosed herein can be used in the context of an in-vehicle control system 150 in a vehicle ecosystem 101 shown in FIG. 1. In one example embodiment, an in-vehicle control system 150 with a proximate vehicle intention prediction module 200 resident in a vehicle 105 can be configured like the architecture and ecosystem 101 illustrated in FIG. 1. However, it will be apparent to those of ordinary skill in the art that the proximate vehicle intention prediction module 200 described and claimed herein can be implemented, configured, and used in a variety of other applications and systems as well.

Figure 1:
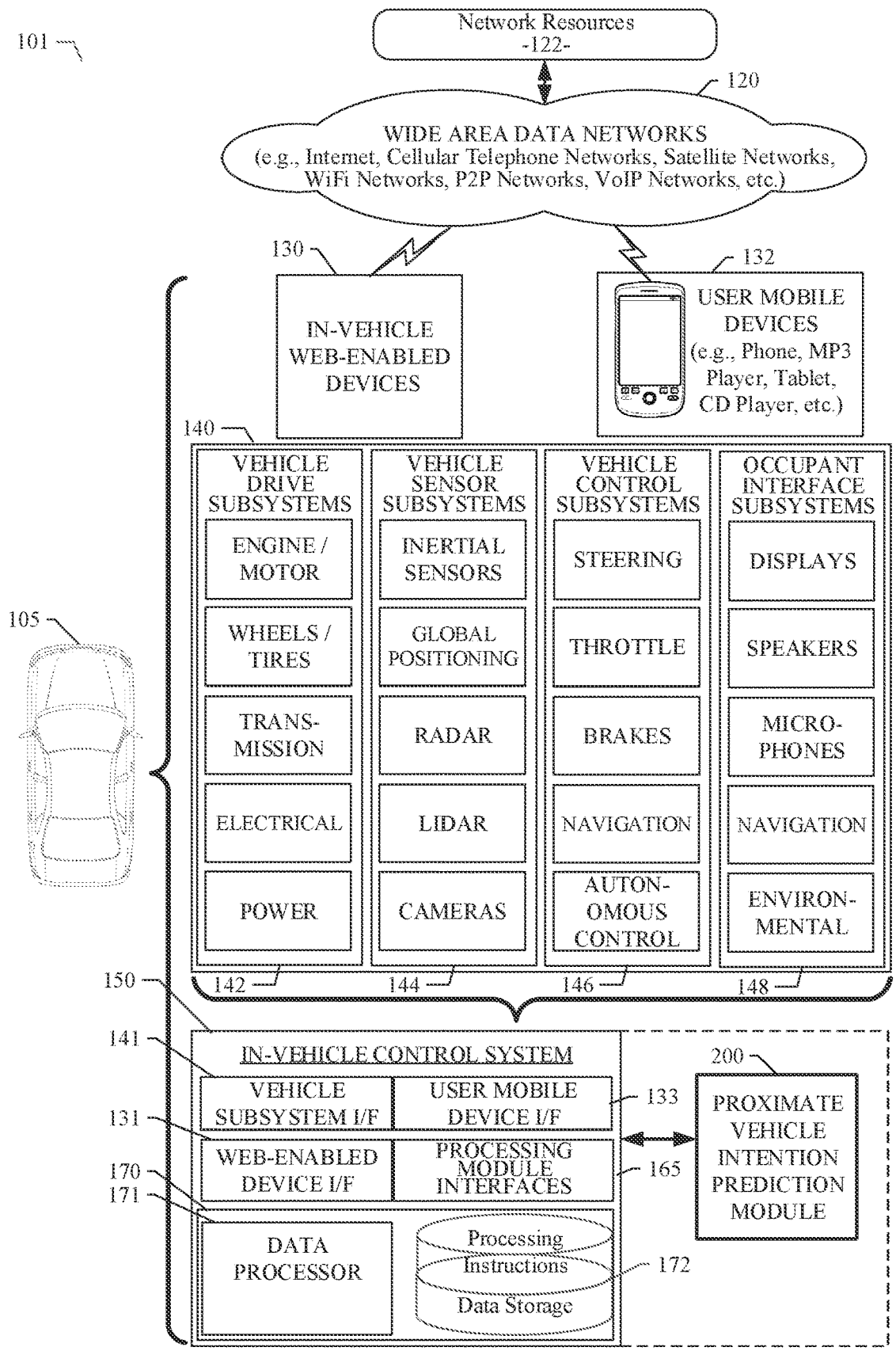
FIG. 1 illustrates a block diagram of an example ecosystem in which a proximate vehicle intention prediction module of an example embodiment can be implemented.

Referring now to FIG. 1, a block diagram illustrates an example ecosystem 101 in which an in-vehicle control system 150 and a proximate vehicle intention prediction module 200 of an example embodiment can be implemented. These components are described in more detail below. Ecosystem 101 includes a variety of systems and components that can generate and/or deliver one or more sources of information/data and related services to the in-vehicle control system 150 and the proximate vehicle intention prediction module 200, which can be installed in the vehicle 105 (herein the autonomous or host vehicle). For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects (e.g., other vehicles) in the proximity of the autonomous or host vehicle. As described in more detail below, the proximate vehicle intention prediction module 200 can process the object data and generate information indicative of the predicted intention of proximate vehicles near to the host vehicle. The predicted intention of the proximate vehicles can be used to infer a predicted behavior and trajectory of the proximate vehicles. In a particular embodiment, the proximate vehicle intention prediction module 200 can process the object data and use the information indicative of the predicted intention of proximate vehicles to generate host vehicle motion planning data, a route, and an execution plan for the host vehicle based on the detected objects and predicted intentions. The motion planning data, route data, and execution plan can be used by an autonomous vehicle control subsystem, as another one of the subsystems of vehicle subsystems 140, or other vehicle system. The autonomous vehicle control subsystem, for example, can use the real-time generated motion planning data, route data, and execution plan to safely and efficiently navigate the host vehicle 105 through a real world driving environment while avoiding obstacles and safely controlling the host vehicle. It will be apparent to those of ordinary skill in the art in view of the disclosure herein that the information indicative of the predicted intention of proximate vehicles generated by the proximate vehicle intention prediction module 200 can be used by a variety of other subsystems and other purposes as well.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the proximate vehicle intention prediction module 200 for processing object data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the proximate vehicle intention prediction module 200. In various example embodiments, a plurality of processing modules, configured similarly to proximate vehicle intention prediction module 200, can be provided for execution by data processor 171. As shown by the dashed lines in FIG. 1, the proximate vehicle intention prediction module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the proximate vehicle intention prediction module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the proximate vehicle intention prediction module 200 can receive web-based data or content via an in-vehicle web-enabled device interface 131, which can be used to connect with the in-vehicle web-enabled device receiver 130 and network 120. In this manner, the in-vehicle control system 150 and the proximate vehicle intention prediction module 200 can support a variety of network-connectable in-vehicle devices and systems from within a vehicle 105.

As shown in FIG. 1, the in-vehicle control system 150 and the proximate vehicle intention prediction module 200 can also receive data, object processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the proximate vehicle intention prediction module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the proximate vehicle intention prediction module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its context in its environment, determine a predicted behavior of at least one other vehicle in the context of the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include a vehicle system with various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the proximate vehicle intention prediction module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the proximate vehicle intention prediction module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the proximate vehicle intention prediction module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, the occupant interface subsystems 148, or other vehicle system.

In addition to the processing instructions, the data storage device 172 may store data such as object processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148, or other vehicle system. For example, the computing system 170 may use input from the vehicle control system 146 in order to control the steering unit to avoid an obstacle detected by the vehicle sensor subsystem 144 and follow a path or trajectory generated by the proximate vehicle intention prediction module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and proximate vehicle intention prediction module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the proximate vehicle intention prediction module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the proximate vehicle intention prediction module 200 can be implemented as in-vehicle components of vehicle 105. In various example embodiments, the in-vehicle control system 150 and the proximate vehicle intention prediction module 200 in data communication therewith can be implemented as integrated components or as separate components. In an example embodiment, the software components of the in-vehicle control system 150 and/or the proximate vehicle intention prediction module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Proximate Vehicle Intention Prediction for Autonomous Vehicles A system and method for proximate vehicle intention prediction for autonomous vehicles is disclosed herein. Specifically, the present disclosure relates to the design, configuration, and/or control of autonomous vehicles using a prediction-based method. In one aspect, the system herein may include various sensors configured to collect perception data, a computing device, and an intention prediction module for predicting an intention and behavior of other vehicles and/or dynamic objects in the vicinity of (proximate to) a host autonomous vehicle. The example embodiments disclosed herein provide a system and method for intention prediction in an autonomous driving architecture. Intention prediction provides autonomous vehicles with the ability to predict the near future behavior of surrounding proximate vehicles and, for example, to improve the motion planning and plan execution of the host vehicle. The system of an example embodiment receives perception data, image features, and map information to generate a series of predictions related to a proximate target vehicle's speed, pose, and intention. Vehicle pose can include the vehicle heading, orientation, speed, acceleration, and the like. In a particular embodiment, the system can provide these predictions to a motion planning module of the host vehicle. In other embodiments, the proximate vehicle intention predictions can be used to design, configure, and/or control an autonomous vehicle or related simulation environments. The system of an example embodiment can also be configured for perception feature selection. The system and method of example embodiments are described in more detail below.

The disclosed embodiments take advantage of the perception information, which includes sensor data, status, and context information from a host autonomous vehicle, to predict the intention and behavior of the proximate vehicles that might have an influence on the host vehicle. The perception information can include image frame sequences from host vehicle cameras, LIDAR data, IMU data, GPS data, and other sensor and perception data as described above. The example embodiments can perform image analysis, such as semantic segmentation, on the image frame sequences from the perception data to identify objects, such as vehicles, in the proximity of the host vehicle.

An example embodiment uses machine learning techniques to analyze a massive amount of perception and context data recorded from the behavior of vehicles and drivers in real world traffic environments. This analysis of the perception and context data enables the embodiments to accurately train a machine learning model to predict the intention and behavior of proximate vehicles and objects for a context in which the host vehicle is operating.

Figure 2:
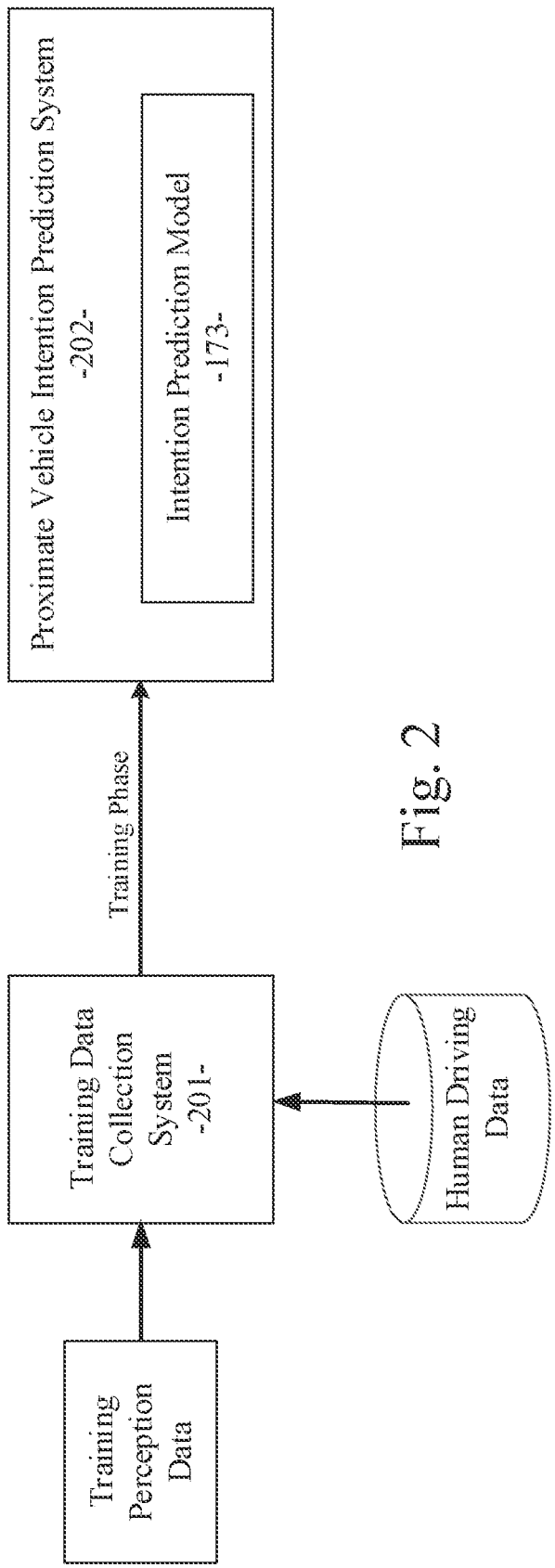
FIG. 2 illustrates an example embodiment of the components of the proximate vehicle intention prediction system in an offline training phase for training and building an intention prediction model in an example embodiment.

Referring now to FIG. 2, an example embodiment disclosed herein can be used in the context of a proximate vehicle intention prediction system 202 for autonomous vehicles. In an example embodiment, the proximate vehicle intention prediction system 202 can include an intention prediction model 173 (described in more detail below), which can be implemented as a machine learning system, neural network, or the like. As such, the example embodiment can be implemented in two phases: an offline training phase and a real-time operational phase. The training phase is used to train and configure the parameters of the machine learning system or neural network of the intention prediction model 173 or any other component of the proximate vehicle intention prediction system 202 implemented with a machine learning system or neural network. The real-time operational phase is used after the machine learning components have been trained and are ready to support the generation of predicted vehicle or object intentions and trajectories in real-time as described in more detail below.

Referring again to FIG. 2, components in the offline training phase for training and building a proximate vehicle intention prediction system 202 in an example embodiment are illustrated. In the training phase, the training data collection system 201 can be used to generate, train, and/or configure the intention prediction model 173 or any other machine learning components of the proximate vehicle intention prediction system 202. As described in more detail below for an example embodiment, the proximate vehicle intention prediction system 202 can use the trained and configured intention prediction model 173 during the operational phase to generate predicted vehicle or object intentions and trajectories based on perception data provided to the proximate vehicle intention prediction system 202 and based on the training the intention prediction model 173 receives from the training data collection system 201 during the training phase.

The training data collection system 201 can include a plurality of training data gathering mechanisms including obtaining training data or training images from a library or human driving database, and obtaining training data or training images from an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the training data collection system 201 positioned adjacent to particular roadways (e.g., monitored locations). Additionally, the training data collection system 201 can include information gathering devices installed in moving test vehicles being navigated through pre-defined routings in an environment or location of interest. The perception information can include data from which a position and velocity of neighboring vehicles in the vicinity of or proximate to the autonomous vehicle or host vehicle can be obtained or calculated. Corresponding ground truth data can also be gathered by the training data collection system 201. As a result, the perception information, ground truth data, and other available information can be obtained, processed, and used to build a training dataset for training and configuring the machine learning components of the proximate vehicle intention prediction system 202.

The training data collection system 201 can thereby collect actual trajectories of vehicles and corresponding ground truth data under different scenarios and different driver actions and intentions in a context. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver actions, behaviors, and intentions can correspond to a driver's short term driving goals, such as turning left or right, accelerating or decelerating, merging, passing, making a turn at an intersection, making a U-turn, and the like. The driver actions, behaviors, and intentions can also correspond to a set of driver or vehicle control actions to accomplish a particular short term driving goal.

The image data and other perception data, ground truth data, context data, and other training data collected by the training data collection system 201 reflects truly realistic, real-world traffic information related to the locations or routings, the scenarios, and the driver actions, behaviors, and intentions being monitored. Using the standard capabilities of well-known data collection devices, the gathered traffic and vehicle image data and other perception or sensor data can be wirelessly transferred (or otherwise transferred) to a data processor of a standard computing system, upon which the training data collection system 201 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, the ground truth data, the driver action and intention data, and other related data gathered or calculated by the training data collection system 201 can be used to generate the training data, which can be used to build, train, and/or configure the intention prediction model 173 in the training phase. For example, as well-known, neural networks or other machine learning systems can be trained to produce configured output based on training data provided to the neural network or other machine learning system in a training phase. The training data provided by the training data collection system 201 can be used to build, train, and/or configure the intention prediction model 173 or any other machine learning components of the proximate vehicle intention prediction system 202 to generate predicted vehicle or object intentions and related predicted vehicle behaviors and trajectories given a current context and the training received during the training phase. As a result, the proximate vehicle intention prediction system 202 can use the trained intention prediction model 173 and the real-world perception data 210 (shown in FIG. 4) in the operational phase to generate predictions of proximate vehicle or object intentions, behaviors, and trajectories. Thus, the example embodiments use the training data collection system 201 to collect training perception data, human driving data, and context data corresponding to human driving behaviors and then use the proximate vehicle intention prediction system 202 and the trained intention prediction model 173 therein to generate predicted vehicle intentions, behaviors, and trajectories based on the human driving behaviors. Additionally during the training phase, the example embodiments can use a loss function to examine and correct the results of the training provided to the intention prediction model 173 by the training data collection system 201. Because the intention prediction model 173 is trained in the training phase using real world, human behavior data, the predicted intention, behavior, and trajectories of vehicles or objects produced by the intention prediction model 173 are closely correlated to the actual intention, behavior, and trajectories of vehicles in real world environments with human drivers and based on a human driver behavior model implemented by the training data collection system 201.

Figure 3:
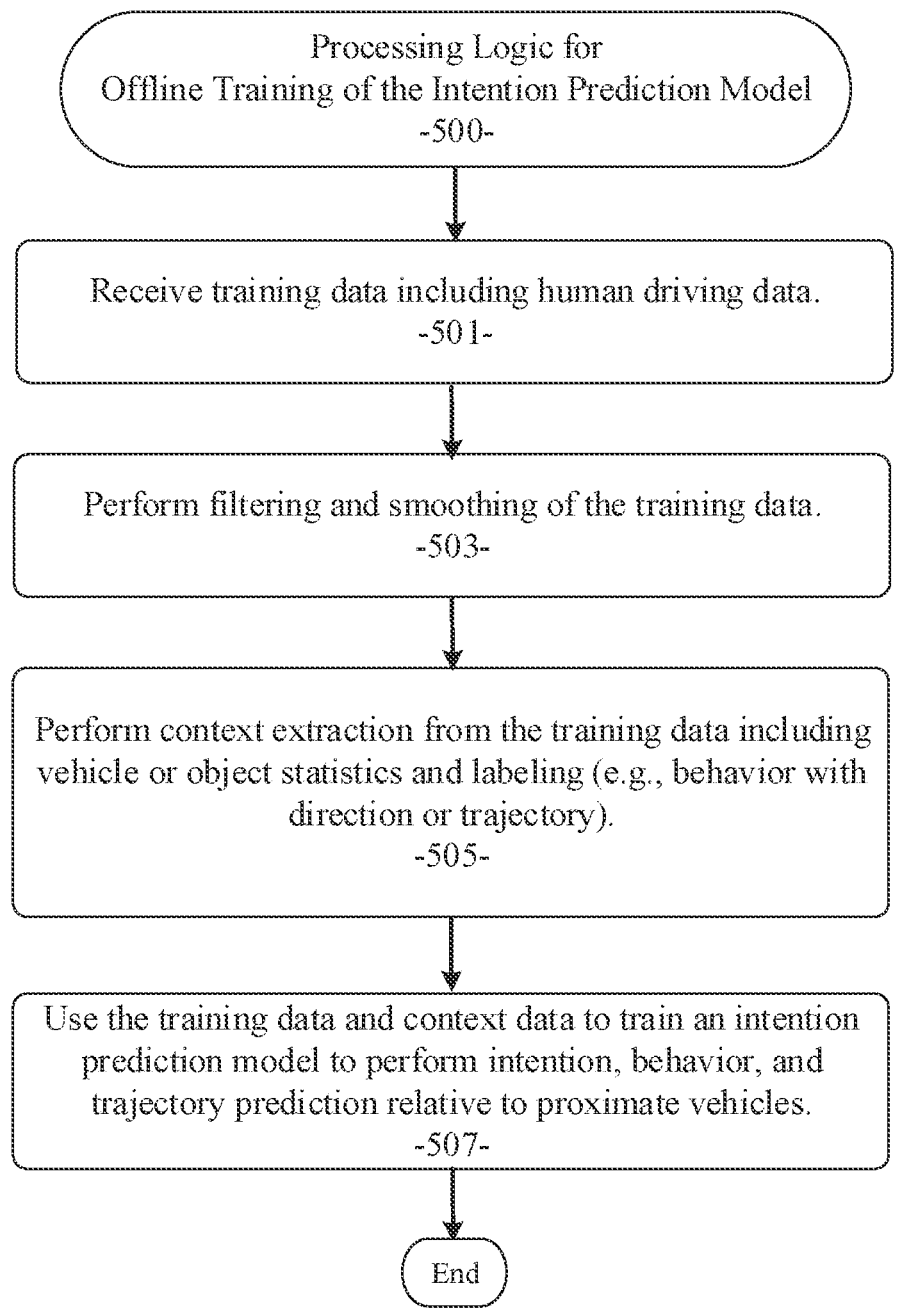
FIG. 3 illustrates a processing workflow for the offline training of the intention prediction model in an example embodiment.

FIG. 3 illustrates a processing workflow 500 for the offline training of the intention prediction model 173 in an example embodiment. In operation block 501, the proximate vehicle intention prediction system 202 can receive training data including human driving data from the training data collection system 201 as described above. The proximate vehicle intention prediction system 202 can then perform filtering and smoothing of the training data (operation block 503). The smoothing can include removing spurious or outlier data. Then in operation block 505, context extraction is performed from the training data including extraction of vehicle or object statistics and labeling (e.g., vehicle or object behavior with direction). An example embodiment can use regression to predict acceleration (operation block 505). Finally, the training data collection system 201 can use the training data and context data to train the intention prediction model 173 to perform intention, behavior, and trajectory prediction relative to proximate vehicles (operation block 507).

Figure 4:
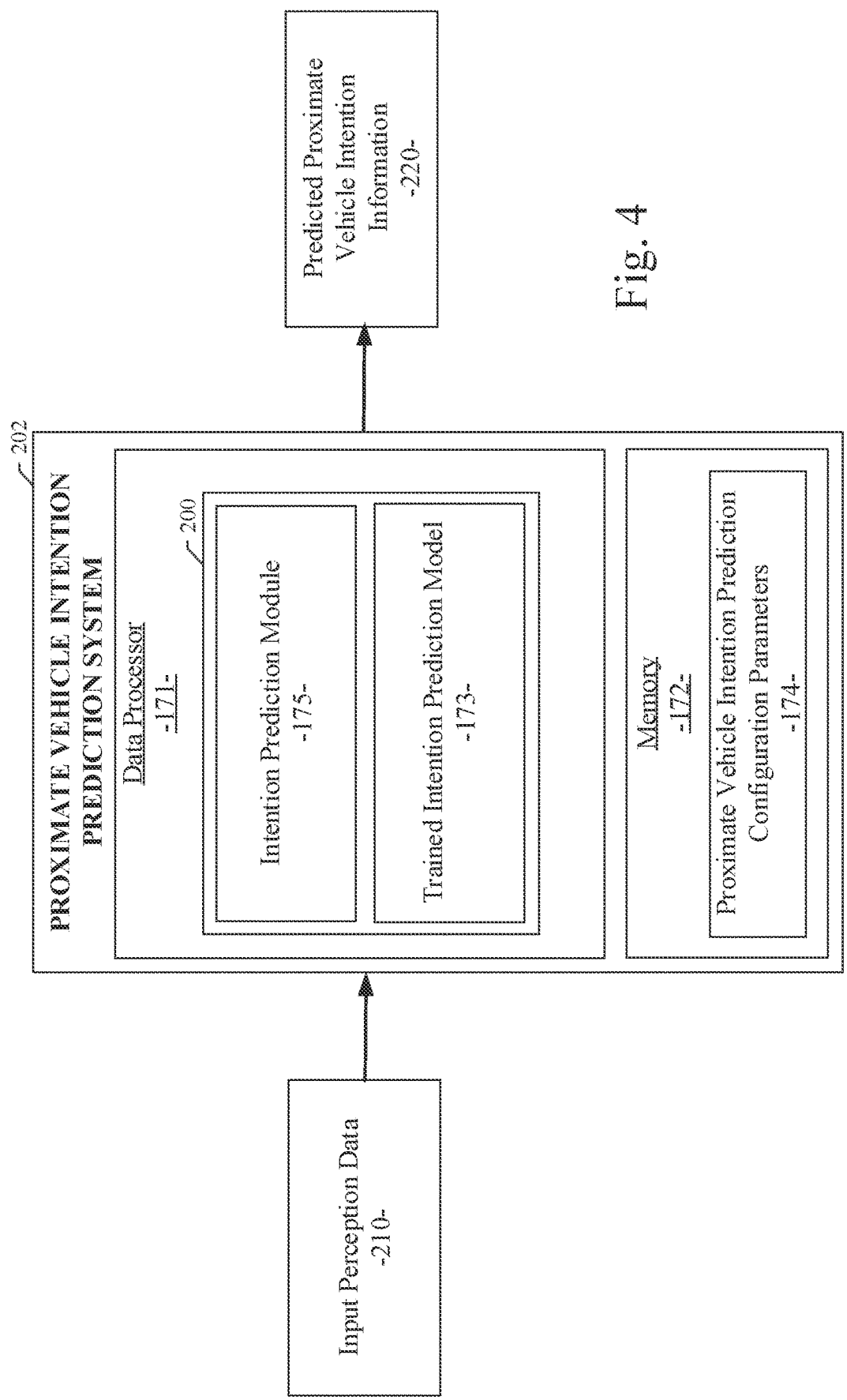
FIG. 4 illustrates an example embodiment of the operational phase components of the proximate vehicle intention prediction system with the intention prediction module and trained intention prediction model therein.

Referring now to FIG. 4, after the intention prediction model 173 of the proximate vehicle intention prediction system 202 is trained in the offline training phase as described above, the intention prediction model 173 can be deployed in an operational phase of the proximate vehicle intention prediction system 202. In the operational phase, the proximate vehicle intention prediction system 202 can use the trained intention prediction model 173 to generate predicted proximate vehicle or object intentions and trajectories based on a human driver behavior model as described above. The operational phase of the proximate vehicle intention prediction system 202 is described in more detail below.

Referring again to FIG. 4, a diagram illustrates an example embodiment of the operational phase components of the proximate vehicle intention prediction system 202 and the proximate vehicle intention prediction module 200 therein. In the example embodiment, the proximate vehicle intention prediction module 200 can be configured to include an intention prediction module 175 and the trained intention prediction model 173. As described in more detail below, the intention prediction module 175 can use the real-time perception data 210 and the trained intention prediction model 173 to generate predicted proximate vehicle or object intentions and trajectories based on the perception data 210 and a human driver behavior model as described above. The predicted proximate vehicle intentions and trajectories can be generated based on input perception data 210 received from one or more of the host vehicle sensor subsystems 144, including one or more cameras, and processed by an image processing module to identify proximate agents (e.g., moving vehicles, dynamic objects, or other objects in the proximate vicinity of the host vehicle). The generated predicted proximate vehicle intentions, behaviors, and trajectories are also based on the training of the intention prediction model 173 by the training data collection system 201 as described above. In a particular embodiment, a motion planner can use the predicted proximate vehicle or object intentions, behaviors, and trajectories to generate motion planning data, route data, and an execution plan for the host vehicle (e.g., the autonomous vehicle). In other embodiments, the generated predicted proximate vehicle intentions, behaviors, and trajectories can be used for a variety of other purposes as well.

The intention prediction module 175 and the trained intention prediction model 173 can be configured as software modules executed by the data processor 171 of the in-vehicle control system 150. The intention prediction module 175 of the proximate vehicle intention prediction module 200 can receive the input perception data 210 and produce predicted proximate vehicle intention information 220 for the host vehicle, which can be used by the autonomous control subsystem of the vehicle control subsystem 146, or other vehicle system, to more efficiently and safely control the host vehicle 105. In various embodiments, the predicted proximate vehicle intention information 220 can be used for a variety of other purposes as well. As part of their proximate vehicle intention prediction processing, the intention prediction module 175 and the intention prediction model 173 can be configured to work with proximate vehicle intention prediction configuration parameters 174, which can be used to customize and fine tune the operation of the proximate vehicle intention prediction module 200. The proximate vehicle intention prediction configuration parameters 174 can be stored in a memory 172 of the in-vehicle control system 150.

In the example embodiment, the proximate vehicle intention prediction module 200 can be configured to include an interface with the in-vehicle control system 150, as shown in FIG. 1, through which the proximate vehicle intention prediction module 200 can send and receive data as described herein. Additionally, the proximate vehicle intention prediction module 200 can be configured to include an interface with the in-vehicle control system 150 and/or other ecosystem 101 subsystems through which the proximate vehicle intention prediction module 200 can receive ancillary data from the various data sources described above. The proximate vehicle intention prediction module 200 can also be implemented in systems and platforms that are not deployed in a vehicle and not necessarily used in or with a vehicle.

In an example embodiment as shown in FIG. 4, the proximate vehicle intention prediction module 200 can be configured to include the intention prediction module 175 and the trained intention prediction model 173, as well as other processing modules not shown for clarity. Each of these modules can be implemented as software, firmware, or other logic components executing or activated within an executable environment of the proximate vehicle intention prediction module 200 operating within or in data communication with the in-vehicle control system 150. Each of these modules of an example embodiment is described in more detail below in connection with the figures provided herein.

Referring again to FIG. 4, the proximate vehicle intention prediction module 200, and the intention prediction module 175 therein, can receive input perception data 210 from one or more of the vehicle sensor subsystems 144, including one or more cameras, in the operational phase. The image data from the vehicle sensor subsystems 144 can be processed by an image processing module to identify proximate agents or other objects (e.g., moving vehicles, dynamic objects, or other objects in the proximate vicinity of the vehicle 105). The process of semantic segmentation can be used for this purpose. The information related to the identified proximate agents or other objects can be received by the proximate vehicle intention prediction module 200, and the intention prediction module 175 therein, as input perception data 210. The intention prediction module 175 can use the input perception data 210 as part of a proximate vehicle intention and trajectory prediction process. In particular, the intention prediction module 175 can use the trained intention prediction model 173 to anticipate or predict the intentions or likely actions or reactions of the proximate agents (e.g., vehicles) near to the host vehicle. The intention prediction module 175 can generate information indicative of the likely intentions, behaviors, and trajectories, or a distribution of likely trajectories of the proximate agents, which are predicted to result from the context of the host vehicle 105 and the related perception data 210. These likely or predicted intentions and trajectories of proximate agents can be determined based on the machine learning techniques configured from the training scenarios produced from prior real-world human driver behavior model data collections gathered and assimilated into training data using the training data collection system 201 as described above. These likely or predicted intentions, behaviors, and trajectories can also be configured or tuned using the configuration data 174. Over the course of collecting data from many human driver behavior model driving scenarios and training machine datasets and rule sets (or neural nets or the like), the likely or predicted intentions, behaviors, and trajectories of proximate agents can be determined with a variable level of confidence or probability. The confidence level or probability value related to a particular predicted trajectory can be retained or associated with the predicted trajectory of each proximate agent detected to be near the host vehicle 105 at a particular point in time. The intention prediction module 175 can generate information indicative of these predicted intentions, behaviors, and trajectories and confidence levels for each proximate agent relative to the context of the host vehicle 105. In a particular embodiment, a motion planner can use the information indicative of the predicted intentions, behaviors, and trajectories and corresponding confidence levels for each proximate agent as generated by the intention prediction module 175 to determine if any of the predicted intentions, behaviors, and trajectories of the proximate agents may conflict with a trajectory or motion plan of the host vehicle 105. Ultimately, the intention prediction module 175 can generate predicted proximate vehicle intention information 220, which can be provided to a variety of downstream subsystems, including a motion planner.

Figure 5:
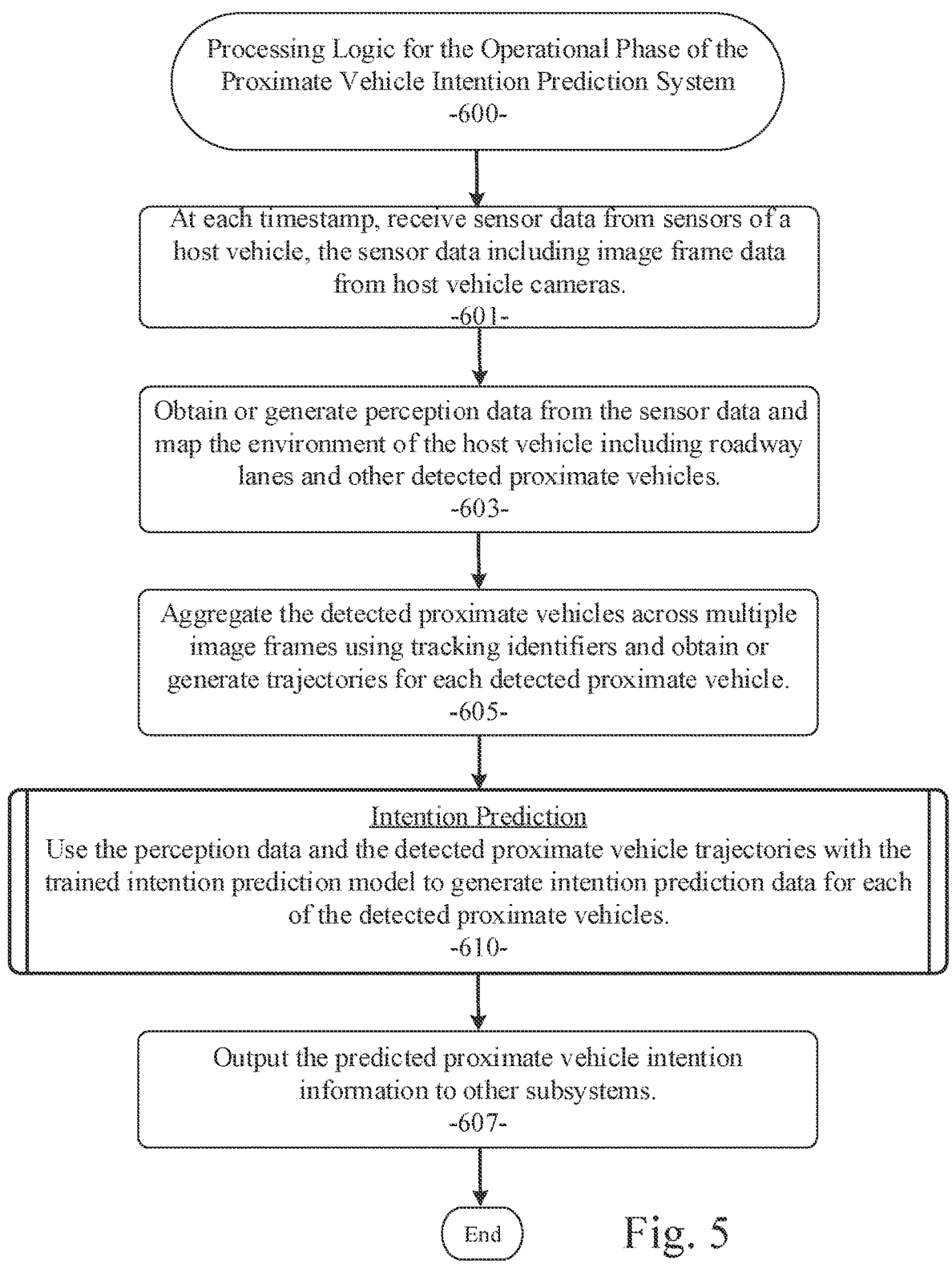
FIG. 5 illustrates a processing workflow for the operational phase use of the proximate vehicle intention prediction system in an example embodiment.

FIGS. 5 through 8 illustrate an operational or processing workflow 600 for the operational phase use of the proximate vehicle intention prediction system 202 in an example embodiment. Referring to FIG. 5, the intention prediction module 175 can receive real-time input perception data 210 periodically with timestamps from one or more of the vehicle sensor subsystems 144, including one or more cameras (operation block 601 shown in FIG. 5). During the operational phase, the disclosed embodiments can use the real-time sensor and perception information gathered from the host vehicle. This real-time perception information can include sensor data, status, and context information related to the host autonomous vehicle, which is used to predict the real-time intention and behavior of the proximate vehicles that might have an influence on the host vehicle. Again, the real-time perception information can include image frame sequences from host vehicle cameras, LIDAR data, IMU data, GPS data, and other sensor and perception data as described above. The example embodiments can perform image analysis, such as semantic segmentation, in real time on the image frame sequences from the perception data to identify objects, such as vehicles, in the proximity of the host vehicle during a real-time driving scenario. As a result, the example embodiments can use the real-time perception information in the operational phase to detect proximate vehicles in the vicinity of the host vehicle and to map the environment of the host vehicle including roadway lanes (operation block 603 shown in FIG. 5). In a particular embodiment, the position of each proximate vehicle relative to the host vehicle can be determined. As a result, the perception data from the host vehicle can be used to determine a context of the host vehicle and each of the proximate vehicles near the host vehicle. Additionally, the example embodiments can aggregate perception data for the detected proximate vehicles across multiple image frames using object tracking identifiers to obtain or generate actual and predicted trajectories for each detected proximate vehicle (operation block 605 shown in FIG. 5). At this point, the intention prediction module 175 can use the trained intention prediction model 173 to predict intentions for each of the detected proximate vehicles. Using the perception and context data and the detected proximate vehicle trajectories with the trained intention prediction model 173, the intention prediction module 175 can generate intention and trajectory prediction data for each of the detected proximate vehicles in an intention prediction process 610 detailed in FIG. 6.

Figure 6:
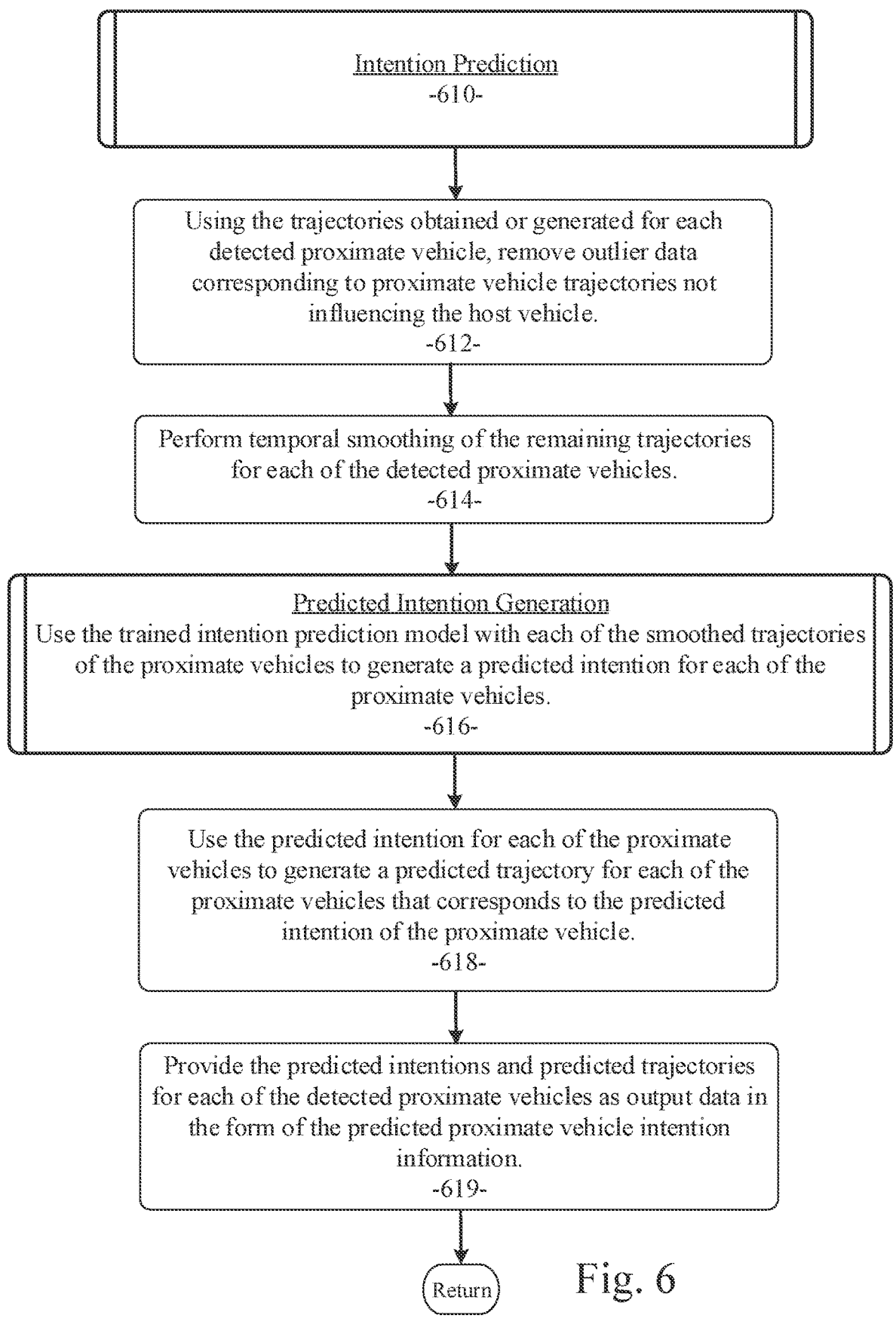
FIG. 6 illustrates a detail of the processing workflow for the operational phase use of the intention prediction process in an example embodiment.

Referring now to FIG. 6, the operational or processing workflow 600 continues with a detail of the intention prediction process 610. In operation block 612 shown in FIG. 6, the intention prediction module 175 can use the trajectories obtained or generated for each detected proximate vehicle and remove or filter outlier data corresponding to proximate vehicle trajectories not influencing the host vehicle. In operation block 614, the intention prediction module 175 can further process the remaining trajectories for each detected proximate vehicle to smooth the trajectory data. The data smoothing can include removing noise and spurious data. Once the trajectory data for proximate vehicles is filtered and smoothed, the intention prediction module 175 can use the trained intention prediction model 173 with each of the filtered and smoothed trajectories of the proximate vehicles to generate a predicted intention for each of the proximate vehicles in a predicted intention generation process 616 detailed in FIG. 7.

Figure 7:
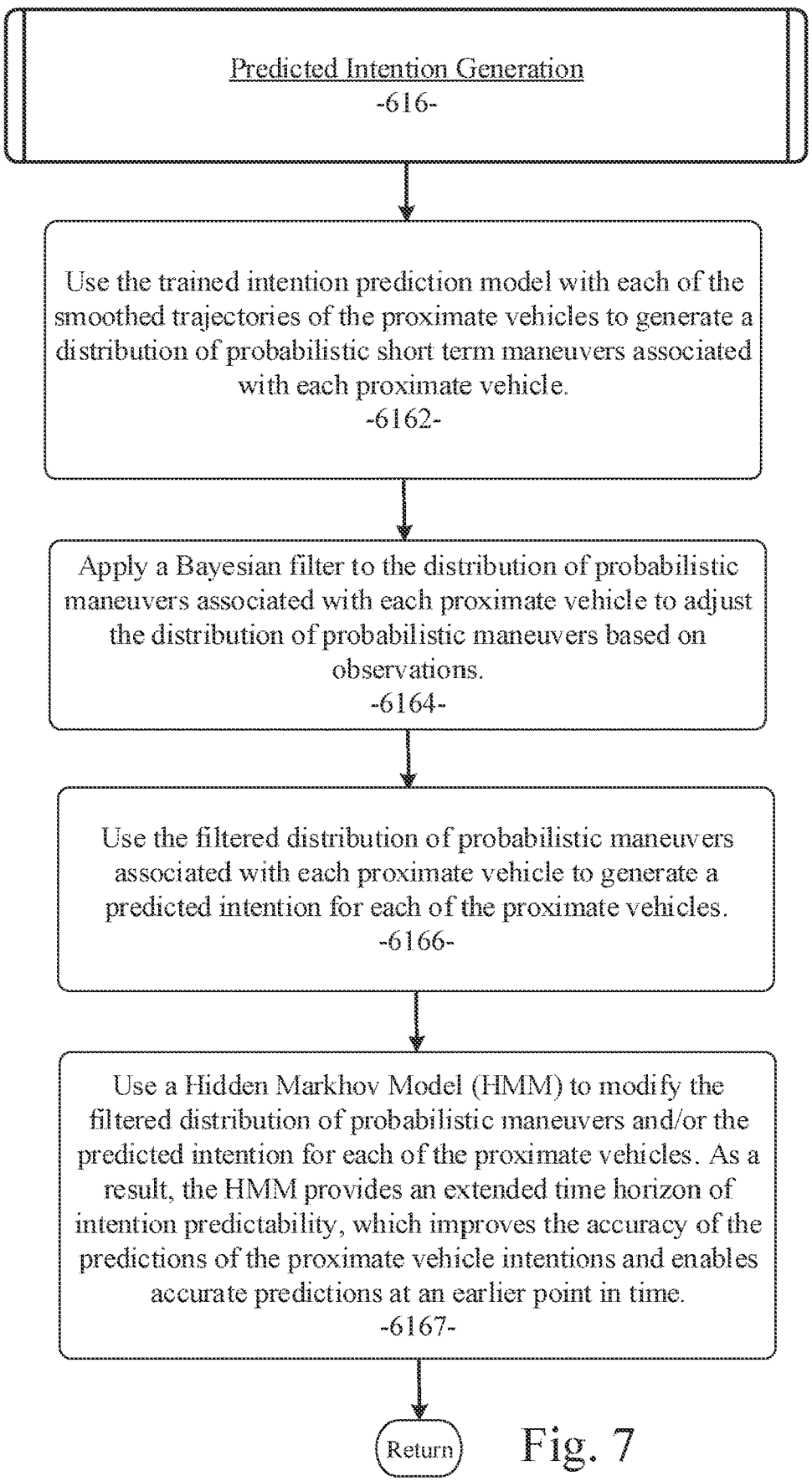
FIG. 7 illustrates a detail of the processing workflow for the operational phase predicted intention generation process in an example embodiment.

Referring now to FIG. 7, the operational or processing workflow 600 continues with a detail of the predicted intention generation process 616. In operation block 6162 shown in FIG. 7, the intention prediction module 175 can use the trained intention prediction model 173 with each of the filtered and smoothed trajectories of the proximate vehicles to generate a distribution of probabilistic short term maneuvers associated with each proximate vehicle. Given the typical patterns of common driving maneuvers, such as acceleration, lane changing, braking, etc. that are embedded into the trained intention prediction model 173, the trained intention prediction model 173 can evaluate how likely it is that a specific proximate vehicle will conform to one of the common driving maneuver patterns. As a result, the trained intention prediction model 173 can make predictions based on the historical data of those patterns, which have high likelihoods, and produce a distribution of probabilistic maneuvers for each proximate vehicle. In operation block 6164, the intention prediction module 175 can apply a Bayesian filter to the distribution of probabilistic maneuvers associated with each proximate vehicle to adjust the distribution of probabilistic maneuvers based on observations (operation block 6164 shown in FIG. 7). In an example embodiment, the Bayesian filter is an application of the Bayes Theorem used in probability theory and statistics, which describes the probability of an event, based on prior knowledge of conditions that might be related to the event. In an example embodiment, the Bayesian filter can be parameterized using driving maneuver pattern distributions and then the parameterized Bayesian filter can be used to refine the output of the trained intention prediction model 173. In operation block 6166, the intention prediction module 175 can use the filtered distribution of probabilistic maneuvers associated with each proximate vehicle to generate a predicted intention for each of the proximate vehicles.

In an alternative embodiment, a larger time frame or extended time horizon of vehicle and driver behaviors can be considered. Using this approach, long term behavior patterns, such as a driver's driving style, can be detected and used to enhance or modify the performance of the intention prediction process described herein. Based on this idea, the alternative embodiment can formulate the intention prediction process as a Hidden Markov Model (HMM), where the long term vehicle and driver behavior patterns are implicitly defined as the hidden states of the HMM, and the maneuvers are taken as observations. At each timestamp, given the current state of the HMM, the alternative embodiment can first generate the filtered distribution of probabilistic maneuvers associated with each proximate vehicle and the predicted intention for each of the proximate vehicles as described above and shown in FIG. 7. Then, as shown at block 6167 in FIG. 7, the alternative embodiment can use the HMM to modify the filtered distribution of probabilistic maneuvers and/or the predicted intention for each of the proximate vehicles based on the current state of the HMM. The hidden states of the HMM capture the longer term vehicle and driver behavior patterns. As a result, the long term vehicle and driver behavior patterns are stored in HMM states to help enhance and improve the accuracy of the intention prediction, and in return the prediction results can be used to update the hidden states. Thus, the HMM provides an extended time horizon of intention predictability, which improves the accuracy of the predictions of the proximate vehicle intentions and enables accurate predictions at an earlier point in time. Having completed the predicted intention generation process 616 shown in FIG. 7, processing can return to block 618 shown in FIG. 6.

Referring again to FIG. 6 at block 618, the predicted intention generation process 616 has used the trained intention prediction model 173 and produced a predicted intention for each of the proximate vehicles. At block 618, the predicted intention for each of the proximate vehicles is used to generate a predicted trajectory for each of the proximate vehicles that corresponds to the predicted intention of the proximate vehicle. At block 619, the predicted intentions and predicted trajectories for each of the detected proximate vehicles can be provided as output data in the form of the predicted proximate vehicle intention information 220, which can be provided to a motion planner or other vehicle or simulation subsystems. Having completed the intention prediction process 610 shown in FIG. 6, processing can return to block 607 shown in FIG. 5.

Referring again to FIG. 5 at block 607, the intention prediction process 610 has generated predicted intentions and predicted trajectories for each of the detected proximate vehicles. At block 607, this data can be output to other vehicle subsystems, such as a motion planner, or other systems as the predicted proximate vehicle intention information. Having completed the intention prediction process 600 shown in the example embodiment of FIG. 5, processing can return or end as shown in FIG. 5. Thus, the processing performed by the intention prediction and motion planning system 202 of an example embodiment is complete.

The various example embodiments described herein use vehicle behavior training data and historical patterns of common driving behaviors to anticipate the intentions and trajectories of proximate vehicles and modify the trajectory of the host vehicle accordingly. As a result, the trajectory for the host vehicle can be modified to avoid potential conflicts with the proximate vehicles. One purpose of the proximate vehicle intention prediction system of the various example embodiments is to avoid collision of the host vehicle with other proximate vehicles and objects on the road. Other traditional methods for collision avoidance use only the historical information from the host vehicle itself. As described in detail herein, the various embodiments use context information of the host vehicle and proximate vehicles to predict the intention, behavior, and trajectories of other proximate vehicles based on training data. As a result, the proximate vehicle intention prediction system of the example embodiments can effectively control an autonomous vehicle in traffic.

Figure 8:
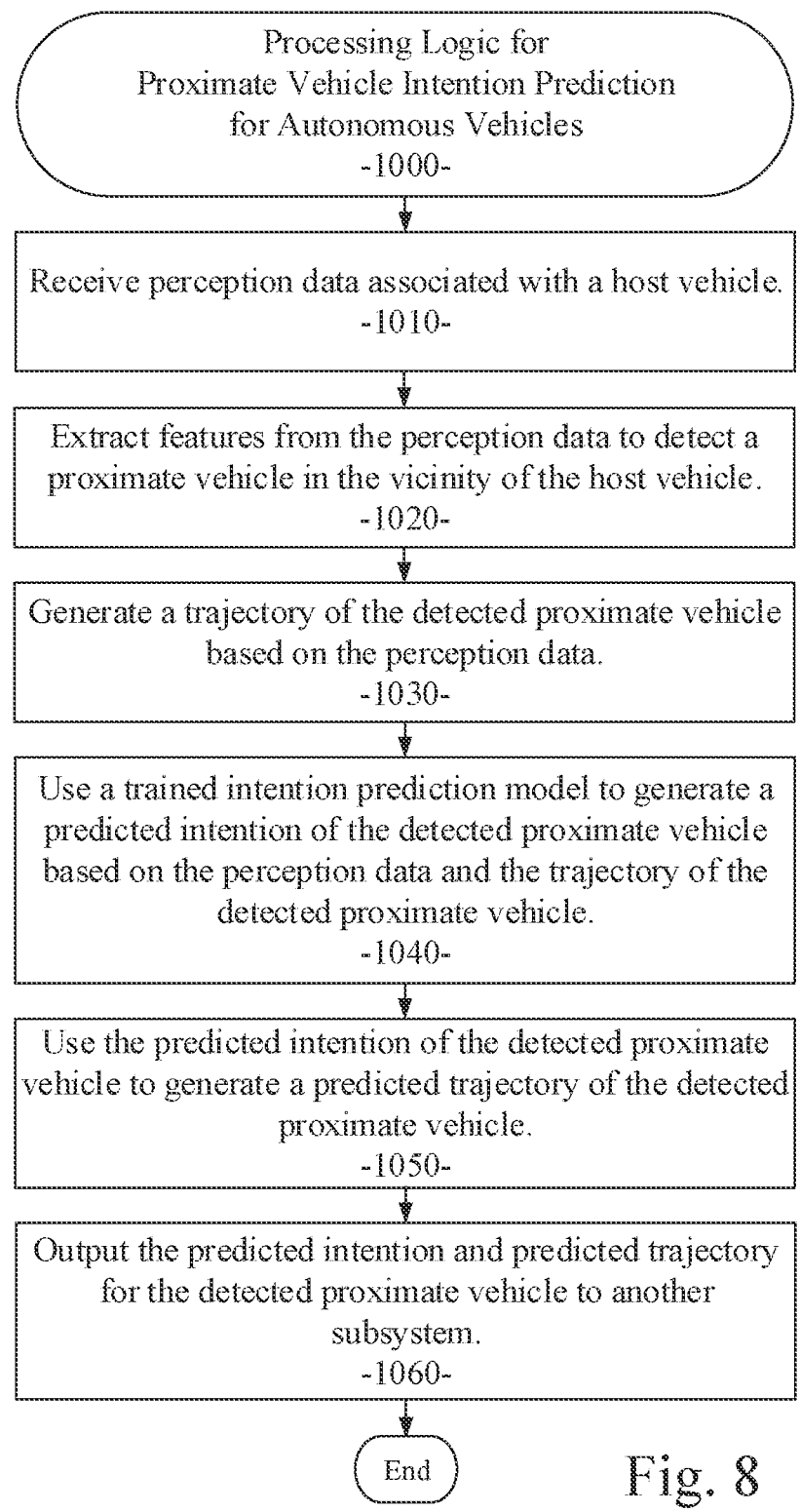
FIG. 8 is a process flow diagram illustrating an example embodiment of a method for proximate vehicle intention prediction for autonomous vehicles.

Referring now to FIG. 8, a flow diagram illustrates an example embodiment of a system and method 1000 for providing proximate vehicle intention prediction for autonomous vehicles. The example embodiment can be configured to: receive perception data associated with a host vehicle (processing block 1010); extract features from the perception data to detect a proximate vehicle in the vicinity of the host vehicle (processing block 1020); generate a trajectory of the detected proximate vehicle based on the perception data (processing block 1030); use a trained intention prediction model to generate a predicted intention of the detected proximate vehicle based on the perception data and the trajectory of the detected proximate vehicle (processing block 1040); use the predicted intention of the detected proximate vehicle to generate a predicted trajectory of the detected proximate vehicle (processing block 1050); and output the predicted intention and predicted trajectory for the detected proximate vehicle to another subsystem (processing block 1060).

As used herein and unless specified otherwise, the term "mobile device" includes any computing or communications device that can communicate with the in-vehicle control system 150 and/or the proximate vehicle intention prediction module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 105 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the proximate vehicle intention prediction module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 105 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the proximate vehicle intention prediction module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the proximate vehicle intention prediction module 200 can be implemented using systems that enhance the security of the execution environment, thereby improving security and reducing the possibility that the in-vehicle control system 150 and/or the proximate vehicle intention prediction module 200 and the related services could be compromised by viruses or malware. For example, the in-vehicle control system 150 and/or the proximate vehicle intention prediction module 200 can be implemented using a Trusted Execution Environment, which can ensure that sensitive data is stored, processed, and communicated in a secure way.

Figure 9:
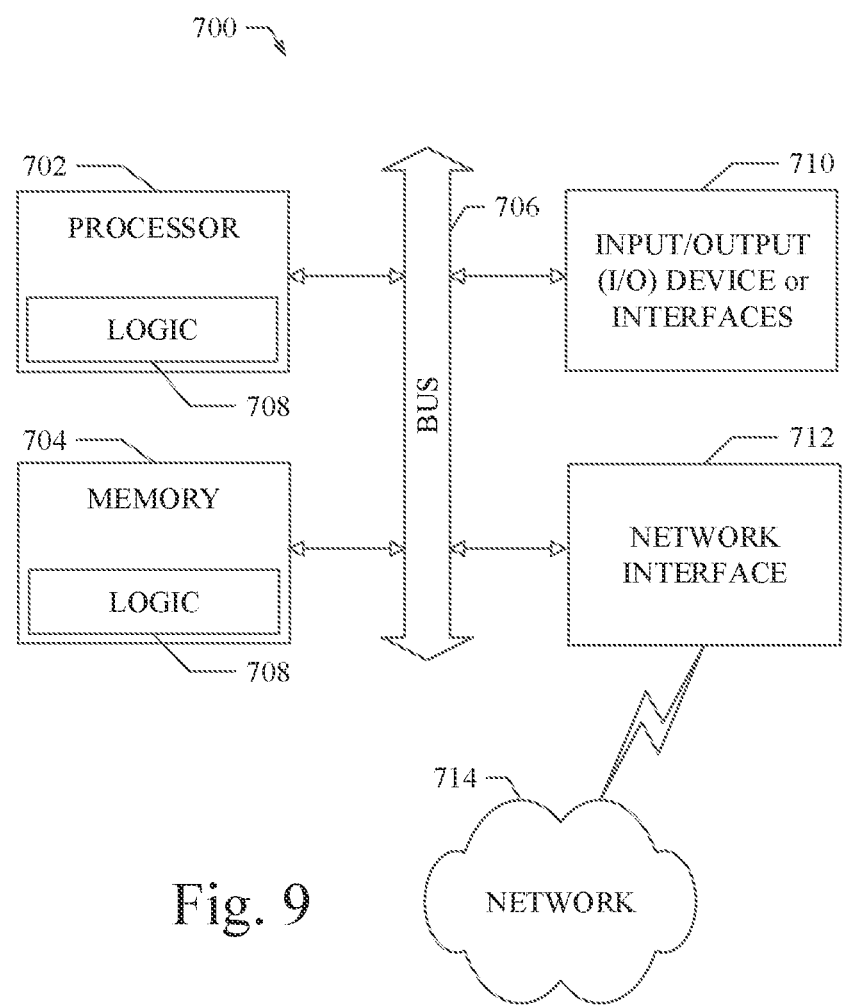
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a processor; and
a memory for storing instructions, wherein the instructions, when executed by the processor, causes the processor to:
receive perception data associated with a host vehicle;
extract features from the perception data;
detect a proximate vehicle in a vicinity of the host vehicle using the extracted features;
generate a trajectory of the detected proximate vehicle based on the perception data;
generate a predicted intention of the detected proximate vehicle using the perception data, the trajectory of the detected proximate vehicle, and an intention prediction model;
modify the predicted intention of the detected proximate vehicle using a Hidden Markov Model (HMM); and
generate a predicted trajectory of the detected proximate vehicle using the modified predicted intention.

2. The system of claim 1, wherein the processor is further configured to:
output the modified predicted intention and the predicted trajectory of the detected proximate vehicle to a motion planner of the host vehicle.

3. The system of claim 1, wherein the perception data comprises data received from at least one of: a camera, an image capture device, an inertial measurement unit (IMU), a global positioning system (GPS) transceiver, a radio detection and ranging (RADAR) device, a laser range finder, a light detection and ranging (LIDAR) device, or a sound navigation and ranging (sonar) device.

4. The system of claim 1, wherein the system is configured to train the intention prediction model using training data.

5. The system of claim 1, wherein the processor is configured to detect the proximate vehicle using semantic segmentation on an image frame sequence from the perception data.

6. The system of claim 1, wherein the processor is configured to generate the trajectory of the detected proximate vehicle using aggregating perception data for the detected proximate vehicle across multiple image frames.

7. A method, comprising:
receiving perception data associated with a host vehicle;
extracting features from the perception data;
detecting a proximate vehicle in a vicinity of the host vehicle using the extracted features;
generating a trajectory of the detected proximate vehicle based on the perception data;
generating a predicted intention of the detected proximate vehicle using the perception data, the trajectory of the detected proximate vehicle, and an intention prediction model;
modifying the predicted intention of the detected proximate vehicle using a Hidden Markov Model (HMM); and
generating a predicted trajectory of the detected proximate vehicle using the modified predicted intention.

8. The method of claim 7, further comprising:
outputting the modified predicted intention and the predicted trajectory of the detected proximate vehicle to a vehicle subsystem of the host vehicle.

9. The method of claim 7, wherein the generating the predicted intention of the detected proximate vehicle comprises:
generating a distribution of probabilistic maneuvers associated with the detected proximate vehicle using the perception data and the trajectory of the detected proximate vehicle.

10. The method of claim 9, further comprising:
obtaining a filtered distribution of the probabilistic maneuvers associated with the detected proximate vehicle by applying a Bayesian filter to the distribution of the probabilistic maneuvers associated with the detected proximate vehicle.

11. The method of claim 10, wherein the Bayesian filter is parameterized using driving maneuver pattern distributions.

12. The method of claim 10, further comprising:
modifying the filtered distribution of the probabilistic maneuvers associated with the detected proximate vehicle using a second HMM.

13. The method of claim 7, further comprising:
updating the HMM using observed maneuvers associated with the detected proximate vehicle.

14. The method of claim 7, wherein the trajectory of the detected proximate vehicle is a smoothed trajectory of the detected proximate vehicle.

15. The method of claim 14, wherein the smoothed trajectory is obtained using temporal smoothing.

16. A non-transitory computer readable storage medium comprising executable instructions that, when executed by at least one processor, cause the at least one processor to perform operations, comprising:
receiving perception data associated with a host vehicle;
extracting features from the perception data;
detecting a proximate vehicle in a vicinity of the host vehicle using the extracted features;
generating a trajectory of the detected proximate vehicle based on the perception data;
generating a predicted intention of the detected proximate vehicle using the perception data, the trajectory of the detected proximate vehicle, and an intention prediction model;
modifying the predicted intention of the detected proximate vehicle using a Hidden Markov Model (HMM); and
generating a predicted trajectory of the detected proximate vehicle using the modified predicted intention.

17. The non-transitory computer readable storage medium of claim 16, wherein the instructions, when executed by the at least one processor, cause the at least one processor to perform operations, comprising:
outputting the modified predicted intention and the predicted trajectory of the detected proximate vehicle to a simulation system.

18. The non-transitory computer readable storage medium of claim 16, wherein the extracting the features from the perception data is performed using semantic segmentation.

19. The non-transitory computer readable storage medium of claim 16, wherein the instructions, when executed by the at least one processor, cause the at least one processor to perform operations, comprising: removing noise and spurious data from the trajectory of the detected proximate vehicle.

20. The non-transitory computer readable storage medium of claim 16, wherein the instructions, when executed by the at least one processor, cause the at least one processor to perform operations, comprising:
 updating hidden states of the HMM using the predicted trajectory of the detected proximate vehicle.

* * * * *